(No Model.)
K. F. BUCHERER.
MIRROR ATTACHMENT FOR BICYCLES.
No. 516,910. Patented Mar. 20, 1894.
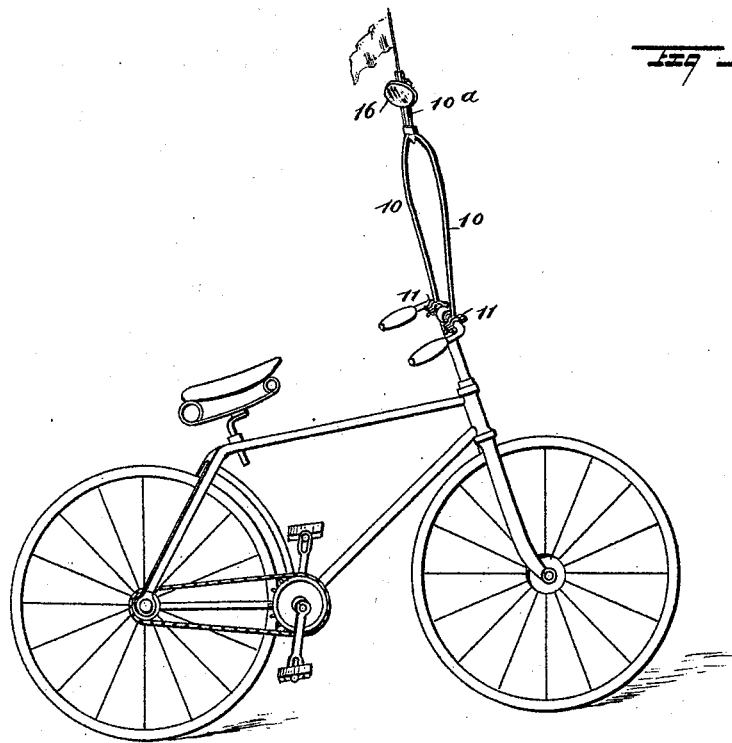
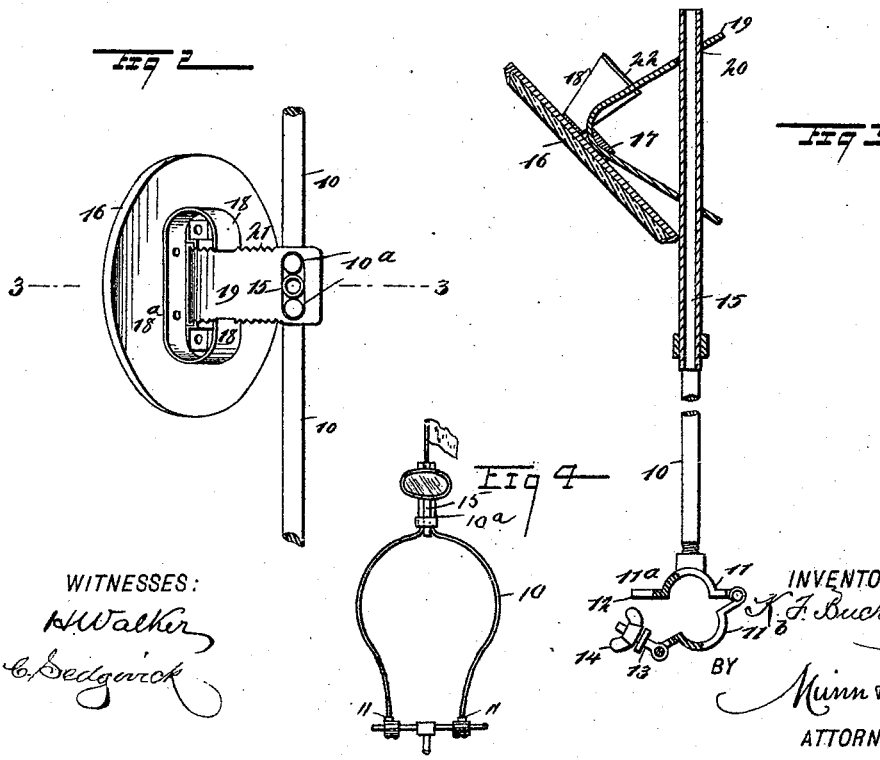
WITNESSES:
H. Walker
C. Sedgwick
INVENTOR
K. F. Bucherer
BY
Munn & Co
ATTORNEYS.

UNITED STATES PATENT OFFICE.

KARL FRIEDRICH BUCHERER, OF NEW YORK, N. Y.

MIRROR ATTACHMENT FOR BICYCLES.

SPECIFICATION forming part of Letters Patent No. 516,910, dated March 20, 1894.

Application filed May 4, 1893. Serial No. 472,942. (No model.)

*To all whom it may concern:*

Be it known that I, KARL FRIEDRICH BUCHERER, of New York city, in the county and State of New York, have invented a new and Improved Mirror Attachment for Bicycles, of which the following is a full, clear, and exact description.

My invention relates to a mirror attachment for bicycles, tricycles and like machines, and it has for its object to so connect an adjustable mirror with the machine that the rider will be enabled to observe carriages, wagons, &c., approaching from the rear without being obliged to turn the head, thereby being in danger of losing the balance or running into or over objects in front of the machine.

A further object of the invention is to provide for an adjustment of the mirror which will enable the rider while facing forward to discern objects immediately back of the wheel or at any desired distance in the rear of the wheel.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in all the views.

Figure 1 is a side elevation of a bicycle, illustrating the improvement applied thereto. Fig. 2 is a perspective view of the mirror and its adjusting mechanism, the mirror being viewed from the back; and Fig. 3 is a vertical section through the mirror and its support, said section being taken practically on the line 3—3 of Fig. 2. Fig. 4 is an elevation of the improvement, looking from the seat of the bicycle.

In carrying out the invention the attachment consists of a yoke-shaped or arch bar 10, which yoke or arch bar may be solid or tubular as in practice may be found desirable. In the formation of the bar 10, the widest space between the members is between the center and the upper or bow portion thereof; and the lower end of each member of the body is provided with a clip 11, of any suitable or approved construction, and the clips are adapted to fasten the body 10 upon the handle bar of the machine, as shown in Fig. 1. Preferably the clips are removable from the body 10, as shown in Fig. 3, and the members of the body may be made in adjustable sections, so that the height thereof may be increased or decreased according to the stature of the rider of the machine to which the attachment is made.

The clips, as shown in Fig. 3, preferably consist of an upper section $11^a$, which is secured to the body, and a lower section $11^b$, is hinged to one end of the upper section. The upper section and likewise the lower section, consist of a semi-circular central section, and flanges at each side of the center. Two of the flanges of the sections are hinged together, while the opposing flange of the upper section is provided with a slot 12, and the corresponding flange of the lower section has pivotally connected with it a locking bolt 13 and thumb nut 14. Thus when the two sections of the clips are made to embrace the upper and lower surfaces of the handle bar of the machine by carrying the locking bolts 14 into the slots 12, and screwing downward the thumb nuts, the clips will be readily attached to the said handle bar, and the body 10 will be held in an upright position over the central portion of the bar.

The upper portion of the body is widened in order that the head and shoulders of the rider may be readily passed between the members of the body when it is necessary for the rider to lean forward over the handle bar.

In constructing the body the members thereof after being made to approach one another at the top are carried vertically upward, the upper projecting ends of the members forming thereby an upper vertical standard $10^a$ for the body. The upper projecting members of the body forming the standard $10^a$, may be brought close together and rigidly attached in any suitable or approved manner; but preferably a tube 15, is located between the two upper projections of the body, as shown in Figs. 2 and 4, the said projections being rigidly secured to the tube, and therefore the standard $10^a$, is preferably made to consist of the two upper extensions of the body and the central tube 15.

A mirror 16, is supported from the standard $10^a$. The mirror may be of any suitable or approved construction, and is provided upon its back with a strap 17, ordinarily placed longitudinally thereof, and above the strap two spring pawls 18, are located, the pawls being placed one at each side of the center, as shown in Fig. 2; and the two pawls may be and preferably are connected or formed integrally with a straight strip 18ª, which is riveted or otherwise secured to the back of the mirror.

A keeper 19, preferably made of spring metal, is employed to directly connect the mirror with the standard. This keeper is practically made V-shaped in general contour, as shown in Fig. 3, being made up of a strip of spring metal bent upon itself to such shape; and in the outer ends of the members of the keeper slots 20, are made, through which the standard 10ª, is passed. Prior to passing the standard through the slots of the keeper, the keeper is passed through the strap 17 of the mirror until its contracted end, which is round instead of being sharp or angular, is located within the strap. The spring in the metal of the keeper will cause the frictional contact between the standard and the walls of the keeper slots to be so great as to hold the keeper in whatever position it may be adjusted vertically upon the standard. The upper portion of the keeper is provided with notches or teeth 21 produced in its side edges, and the pawls engage with the toothed or notched surfaces of the keeper. The engaging faces of the pawls are made exceedingly wide in order that the mirror may be given any desired inclination without the pawls slipping from engagement with the keeper; and preferably the pawls are provided at their engaging end with inwardly-extending jaws 22, as shown in Fig. 3, which jaws engage with the teeth or enter the spaces between them; or the pawls may be so curved, as shown in Fig. 2, that the jaws will not be needed. Thus it will be observed that with one hand the mirror may be brought to a vertical position, or given any desired inclination upward or downward by simply carrying the mirror in the direction required; and the pawls will at that time slip over the racked surface of the keeper and will remain in whatever notches they may have entered when manipulation of the mirror ceases.

It will be understood that the mirror is placed upon the rear face of the standard so as to face the rider, and I desire it to be understood that the tubular section 15 of the standards may be employed to receive the staff of a flag, or the handle of a sun-shade or umbrella; or a fan may be placed in said tubular section if in practice it is found desirable.

Such an attachment is exceedingly simple, and is capable of being attached to any form of machine; it is not in the way, and it may be constructed so light as to add but little weight to the machine, and it may be readily applied or detached as occasion may demand.

Having thus described my invention, I claim as new and desire to secure by Letters Patent—

1. In a bicycle or like machine, the combination, with a standard supported on the machine, of a spring keeper adapted to be adjusted vertically on the said standard and to be held thereon by its own elasticity, and a mirror loosely held on the keeper, as set forth, whereby the mirror can be adjusted with one hand to assume various inclinations in relation to the keeper, substantially as described.

2. In a bicycle or like machine, the combination, with a standard supported on the machine, of a V-shaped keeper made of an elastic material and provided in its diverging members, with slots for the reception of the said standard, whereby the keeper is made vertically adjustable on the standard and will be held thereon by its own elasticity, the longitudinal axis of the keeper being essentially at right angles to the standard, and a mirror connected with the said keeper at the bend thereof, substantially as described.

3. In a bicycle or like machine, the combination, with a standard supported on the machine, of a detachable keeper provided with teeth at its sides and adapted to be adjusted vertically on the said standard, a mirror loosely and detachably held on the keeper, pawls secured to the mirror, and adapted for engagement with the keeper, substantially as and for the purpose set forth.

KARL FRIEDRICH BUCHERER.

Witnesses:
J. FRED. ACKER,
E. M. CLARK.